No. 3,290. REISSUED FEB. 9, 1869.

J. A. BAILEY.

ROLLING TAPER BARS OF IRON.

United States Patent Office.

CHARLES PARKER, OF MERIDEN, CONNECTICUT, ASSIGNEE, BY MESNE ASSIGNMENTS, OF JOHN A. BAILEY.

*Letters Patent No.* 19,963, *dated April* 13, 1858; *reissue No.* 3,290, *dated February* 9, 1869.

IMPROVEMENT IN ROLLING TAPER BARS OF IRON.

The Schedule referred to in these Letters Patent and making part of the same.

*To all whom it may concern:*

Be it known that JOHN A. BAILEY, of Boston, in the county of Suffolk, and State of Massachusetts, has invented a new Improvement in Rolling-Mills; and I do hereby declare the following, when taken in connection with the accompanying drawings, and the letters of reference marked thereon, to be a full, clear, and exact description of the same, and which said drawings constitute part of this specification, and represent, in—

Figure 1:
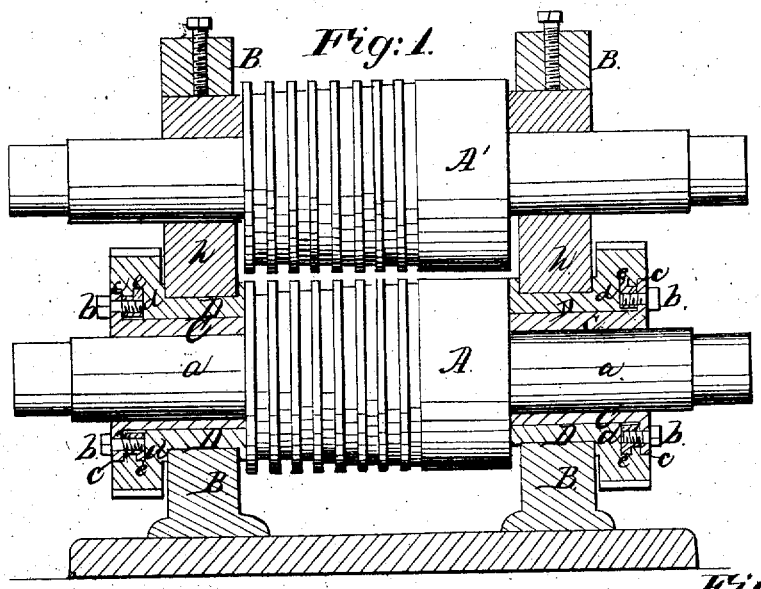
Figure 2:
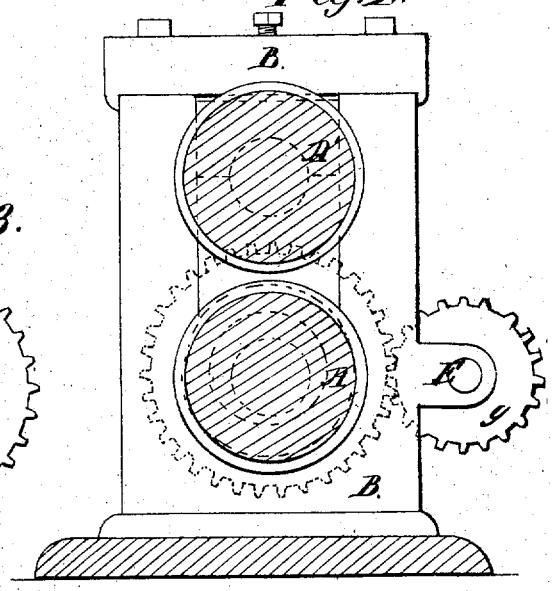
Figure 4:
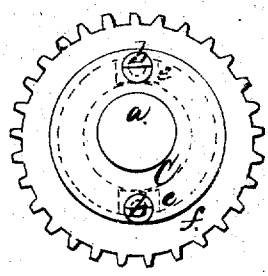
Figure 3:
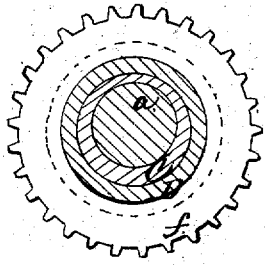

Figure 1, a vertical section of a rolling-mill, with the improvement taken in a plane which passes through the axes of both rollers, but leaving the rollers entire;

Figure 2, a vertical section, taken at right angles to fig. 1;

Figure 3, a transverse section of one of the journals of the lower roller, and of the two eccentrics which are hereto applied, and which constitute the invention;

Figure 4, an end view of the lower roller, with its eccentrics; and in

Figures 5, 6, 7, and 8, diagrams of the operation of the invention.

This invention consists of improvements in rolling-mills, one of which is applicable to other uses; and it consists—

First, in combining one of a pair of rolls with eccentrics applied to the journals, for the purpose of imparting a reciprocating motion to the said roll, for the purpose of rolling taper or irregular forms.

Second, combining a rotating eccentric with a second eccentric arranged upon it, so that the reciprocating movement imparted by one of the eccentrics is varied by the adjustment of the other.

Third, the combination of one of the rolls of a pair with two eccentrics arranged upon each journal, for the purpose of imparting a reciprocating motion to the roll, and varying the said reciprocating motion.

To enable others skilled in the art to make and use the invention, I will proceed to describe the mode in which it has been applied.

A A are the two rollers of a mill, which are intended to be similar in all essential features to the rollers commonly employed, and to be geared together in the usual manner, but their gearing does not require to be, and is not shown in the drawing, as it is supposed to be of the kind commonly used for the purpose.

B B are the housings of the rollers.

The lower roller A does not work in fixed bearings in the housings, but its journals *a a*, which are concentric to its periphery, are fitted each with an eccentric, C, in which it is capable of turning freely, and to the exterior of which is fitted a second eccentric, D.

These eccentrics C D consist of metal sleeves, whose exteriors and interiors are cylindrical, but eccentric to each other, but both C and D, as here represented, have the same degree of eccentricity.

When these eccentrics are applied to the journals, the exteriors of the outer eccentrics D may be brought to a condition concentric to the journals, or of any degree of eccentricity thereto, not greater than the sum of the eccentricities of the two eccentrics, by turning either eccentric of each pair C and D, the said condition of concentricity being produced by setting the eccentricities of the eccentrics C D in diametrically opposite directions, and the greatest eccentricity by setting the eccentricities of both in the same direction, and the lesser degrees of eccentricity, by shifting the eccentrics to the intermediate relative positions.

Each set of eccentrics C D is capable of being secured firmly together by screw bolts *b b*, which pass through a flanch, *c*, on the exterior of C, and screw into nuts *d d*, which are fitted into a cavity in D, and retained therein by tongues *e e*, which are formed upon them in such a manner as to enter a groove turned in the back part of the cavity, as shown in fig. 1.

By slackening the screw-bolts *b b*, the eccentrics are left free to turn relatively to each other for adjustment, and by tightening the screws, they can be secured together in any relative position.

The flanch *c* is concentric to the exterior of the eccentric C, and fits up to a shoulder in the cavity of the eccentric D, which is concentric to the cylindrical interior of the latter.

The cylindrical exterior of each outer eccentric D is fitted to turn in a stationary bearing in the housings, in the same manner as the journals of the lower roller are fitted in an ordinary rolling-mill, and each of said outer eccentrics is finished with a spur-gear, *f*, which is concentric to its cylindrical exterior, and which gears with one of two pinions *g*, on a shaft, E.

The caps *h h* of the bearings of the concentrics D D contain or support the bearings for the journals of the upper roller.

The special advantage of this peculiar adjustment in rolling-mills, is in the operation of rolling articles of taper-form, as, for instance, taper-file blanks, which, by this adjustment, may be produced of any desired taper, (within certain limits,) by setting the two sets of eccentrics, and securing them, as hereinbefore described, with the cylindrical exteriors of D D at a proper degree of eccentricity to the journals *a a*, and giving the eccentrics a rotary motion at the same time.

Figure 6:
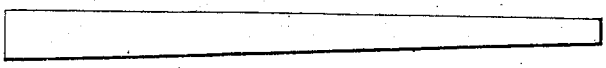
Figure 7:
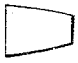

This rotary motion imparts to the roller a reciprocating motion, which causes the lower roller to approach or recede from the upper one, which it is evident must impart a taper-form on the article rolled between them. The taper-form thus produced is not, however, straight-sided, but curved, as seen in figs. 5, 6, 7.

The degree of taper may, to a certain extent, be varied, by varying the eccentricity of the rollers, but the variation thus obtained is limited, and further variation has to be obtained by varying the velocity of the rotary motion of the eccentrics relatively to that of the rollers, or by varying the adjustment of one eccentric of a set relatively to the other, or by both of these variations.

The first method of effecting the variation will be readily understood, but the others require explanation.

Figure 8:
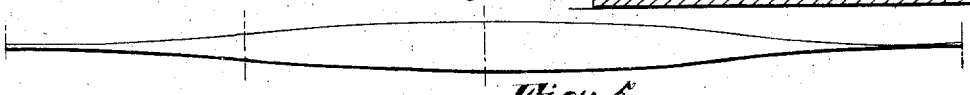
Figure 5:
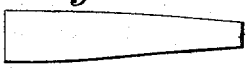

Suppose, for instance, the eccentrics make the same number of revolutions as the lower rolls, the length to which the taper could be extended would only be equal to half the circumference of the rollers, as the entire revolution would produce the form shown in fig. 8; but as, of the taper-form produced by the half revolution, one half has a concave and the other, a convex profile, as will be seen by reference to fig. 1, the taper cannot be extended in the proper form for taper-file blanks, or similar articles, represented in fig. 5, beyond a length equal to one-half the circumference of the rollers, without diminishing the speed of the eccentrics, but by diminishing the speed, the taper may be extended to the length of more than the half or whole circumference of the rollers, or even of several times the circumference, though the maximum and minimum thicknesses will be the same, or by making the velocity of the eccentric greater than that of the rollers, the length of the taper will be diminished.

The effects of reducing and increasing the velocity of the eccentrics, relatively to that of the rollers, are illustrated in figs. 6 and 7, and will be appreciated by comparing those figures with fig. 5.

This mode of applying eccentrics to the journals of one of the rollers of a rolling-mill may be employed for rolling many forms; for instance, any portion of a form like fig. 8 can be produced, or a series of connected repetitions of a form of the same character as that figure, or, by an intermittent motion of the eccentrics, a variety of forms may be produced.

When the eccentrics are set, the journals *a a* then rotate in the eccentrics C C, as in stationary bearings, or if the eccentrics be set so as to make the exteriors of D D concentric to the journals, a parallel form will be produced, whether the eccentrics are stationary or not.

The object in employing, in rolling-mills, the combination of two eccentrics at each journal, or, as they may be termed, the compound eccentrics C D, is to enable a greater or less degree of taper to be produced, that is to say, to impart to the roll a greater or less reciprocating movement; in other words, to vary the maximum and minimum thicknesses that could be produced by the use of a single eccentric at each journal.

Were not this variation required, a single or simple eccentric might be applied to each journal, its interior fitting the journal, and its exterior the fixed bearing in the housings, and this is considered as the equivalent of the compound eccentric for the purpose of producing the reciprocating movement alone.

It will be evident to those skilled in the art that a compound eccentric, that is to say, one eccentric upon another, may be applied with like advantage to many machines other than rolling-mills, where a reciprocating movement, and a variation or adjustment of the same is required, as, when the two eccentrics are combined, the one, while revolving, imparts a reciprocating movement, and the other will vary or adjust the said movement, as to point of beginning and ending.

Having fully described this invention,

What is claimed as new and useful, and desired to be secured by Letters Patent, is—

1. The combination of one roll of a set with eccentrics applied to its journals, for the purpose of imparting reciprocating motion to the roll, substantially as set forth.

2. Combining a rotating eccentric with a second eccentric arranged upon it, so that the reciprocating movement imparted by one of the eccentrics may be varied by the other, substantially as set forth.

3. The combination of one roll of a set with two eccentrics arranged upon each journal, for the purpose of imparting a reciprocating motion to the roll, and varying the said reciprocating motion, substantially as set forth.

CHARLES PARKER.

Witnesses:
JOHN W. MILES,
ALMERON MILES.